(12) United States Patent
Meyers

(10) Patent No.: US 11,811,564 B2
(45) Date of Patent: Nov. 7, 2023

(54) METHODS AND SYSTEMS OF DIFFERENTIAL-SIGNAL RECEIVERS

(71) Applicant: SEMICONDUCTOR COMPONENTS INDUSTRIES, LLC, Phoenix, AZ (US)

(72) Inventor: Manuel Hortensia L. Meyers, Leuven (BE)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 15 days.

(21) Appl. No.: 17/453,200

(22) Filed: Nov. 2, 2021

(65) Prior Publication Data

US 2023/0134043 A1   May 4, 2023

(51) Int. Cl.
*H04L 25/02* (2006.01)

(52) U.S. Cl.
CPC ...... *H04L 25/0292* (2013.01); *H04L 25/0272* (2013.01)

(58) Field of Classification Search
CPC .............. H04L 25/0292; H04L 25/0272
USPC ...................................................... 327/333
See application file for complete search history.

(56) References Cited

U.S. PATENT DOCUMENTS

| | | | |
|---|---|---|---|
| 9,236,841 B2 | 1/2016 | Ciubotaru | |
| 9,608,636 B2 | 3/2017 | Lau | |
| 10,211,792 B2 | 2/2019 | Frohlich et al. | |
| 11,233,482 B2 | 1/2022 | Al-Shyoukh | |
| 2003/0071673 A1 | 4/2003 | Jordanger et al. | |
| 2007/0210836 A1 | 9/2007 | Laulanet et al. | |
| 2013/0021082 A1* | 1/2013 | Aude | H03F 3/45668 327/309 |
| 2016/0079942 A1 | 3/2016 | Li et al. | |

OTHER PUBLICATIONS

German Search Report dated Sep. 1, 2023 for German Application No. 102022126644.3, 11 pages.

\* cited by examiner

*Primary Examiner* — Tomi Skibinski
(74) *Attorney, Agent, or Firm* — Dickinson Wright PLLC; Mark E. Scott

(57) ABSTRACT

Differential-signal receivers. One example is a method of operating a differential-signal receiver, the method comprising: receiving a first differential signal on a differential-signal pair, the first differential signal accompanying a common-mode voltage that is positive relative to a reference voltage of the differential-signal receiver; clamping, when the first differential signal is positive, an OUT+ node at a first voltage; and clamping, when the first differential signal is negative, the OUT− node at a second voltage.

20 Claims, 10 Drawing Sheets

METHODS AND SYSTEMS OF DIFFERENTIAL-SIGNAL RECEIVERS

CROSS-REFERENCE TO RELATED APPLICATIONS

Not Applicable.

BACKGROUND

Low voltage differential signaling (LVDS) is a communication system in which data communication is achieved by a transmitter driving differential signals across conductors, such as conductors of a twisted-pair cable. Receivers in such systems sense the differential signals across the conductors of the twisted-pair cable, not necessarily the absolute voltage on either conductor with respect to a reference voltage (e.g., ground, common). LVDS communication systems enable communication in situations in which electromagnetic interference along the communication path may cause unwanted common-mode voltage on the conductors (e.g., a DC bias or time-varying bias).

Related-art systems are operable in situations where the magnitude of the common-mode voltage resides in a defined range between the ground reference of the receiver and the supply voltage of the receiver. However, in some situations, such as in use in electric and hybrid-electric vehicles, and depending on the distance between the transmitter and receiver, the electromagnetic interference may be significant and the common-mode voltage may rise above the supply voltage and/or may fall below the ground reference for the receiver.

SUMMARY

One example is a method of operating a differential-signal receiver, the method comprising: receiving a first differential signal on a differential-signal pair, the first differential signal accompanying a common-mode voltage that is positive relative to a reference voltage of the differential-signal receiver; clamping, when the first differential signal is positive, an OUT+ node at a first voltage; and clamping, when the first differential signal is negative, an OUT− node at a second voltage.

In the example method, clamping the OUT+ node at the first voltage may further comprise: flowing a first current through a first transistor of a selector circuit and creating a first mirror current flowing away from the OUT+ node to clamp the OUT+ node at the first voltage, the first mirror current based on to the first current; and refraining from flowing current through a second transistor of the selector circuit, and creating a second mirror current away from the OUT− node, the second mirror current based on the first current. Clamping the OUT− node at the second voltage may further comprise: flowing a second current through the second transistor of the selector circuit and creating a third mirror current flowing away from the OUT− node to clamp the OUT− node at the second voltage, the third mirror current based on the second current; and refraining from flowing current through the first transistor of the selector circuit, and creating a fourth mirror current away from the OUT+ node, the fourth mirror current based on the second current.

The example method may further comprise: receiving a second differential signal on the differential-signal pair, the second differential signal accompanying a common-mode voltage that is negative relative to the reference voltage of the differential-signal receiver; supplying, by the differential-signal receiver, a bias current to the OUT+ node and supplying a bias current to the OUT− node; clamping, when the second differential signal is positive, the OUT+ node at a third voltage; and clamping, when the second differential signal is negative, the OUT− node at a fourth voltage. Clamping the OUT+ node at the third voltage may further comprise: flowing a first current through a first transistor of a selector circuit and creating a first mirror current flowing away from the OUT+ node to clamp the OUT+ node at the third voltage, the first mirror current based on the first current; and refraining from flowing current through a second transistor of the selector circuit, and creating a second mirror current away from the OUT− node, the second mirror current based on the first current. Clamping the OUT− node at the fourth voltage may further comprise: flowing a second current through the second transistor of the selector circuit and creating a third mirror current flowing away from the OUT− node to clamp the OUT− node at the fourth voltage, the second mirror current based on the second current; and refraining from flowing current through the first transistor of the selector circuit, and creating a fourth mirror current away from the OUT+ node, the fourth mirror current based on the second current.

The example method may further comprise, when the first differential signal across the differential-signal pair is zero and the common-mode voltage is below a first predetermined threshold that is non-zero and positive, clamping the OUT+ node and the OUT− node at a third clamp voltage. Clamping at the third clamp voltage may further comprise: driving a first bias current having a magnitude to the OUT+ node; and driving a second bias current having the magnitude to the OUT− node.

Another example is a differential-signal receiver comprising: an IN+ terminal, an IN− terminal, an OUT+ node, and an OUT− node; a first resistor having a first resistance, the first resistor coupled between the IN+ terminal and the OUT+ node; a second resistor having a second resistance, the second resistor coupled between the IN− terminal and the OUT− node; a first transistor having first connection coupled to the OUT+ node, a second connection coupled to a reference voltage, and a control input; a second transistor having first connection coupled to the OUT− node, a second connection coupled to the reference voltage, and a control input coupled to the control input of the first transistor; and a selector circuit defining a plus port coupled to the OUT+ node, a minus port coupled to the OUT− node, and a mirror output coupled to the control input of the first transistor and the control input of the second transistor. The selector circuit may be configured to, when a common-mode voltage on the IN+ and the IN− terminal is positive, drive the mirror output proportional to a magnitude of the common-mode voltage.

In the example differential-signal receiver, the selector circuit may further comprise: a third transistor having a first connection coupled to a voltage source, a second connection coupled to the mirror output, and a control input coupled to the OUT+ node; and a fourth transistor having a first connection coupled to the voltage source, a second connection coupled to the mirror output, and a control input coupled to the OUT− node.

In the example differential-signal receiver, the third transistor may be an N-channel field effect transistor (FET), and the fourth transistor may be an N-channel FET.

The example differential-signal receiver may further comprise: a third resistor coupled between the voltage source and the first connection of the third transistor, the third resistor having a third resistance; and a fourth resistor coupled between the voltage source and the first connection of the fourth transistor, the fourth resistor having a fourth resistance. The differential-signal receiver may be configured to reproduce a differential signal received on the IN+ terminal and the IN− terminal across the first connection of the third transistor and the first connection of the fourth transistor.

The example differential-signal receiver may further comprise a bias circuit, and the bias circuit may comprise: a positive-drive output coupled to the OUT+ node; a negative-drive output coupled to the OUT− node; and a sense input coupled to the mirror output. The bias circuit may be configured to, when the common-mode voltage is below a predetermined threshold, drive a bias current to the OUT+ node and drive a bias current to the OUT− node, the bias currents proportion to an amount the magnitude of the common-mode voltage is below the predetermined threshold.

In the example differential-signal receiver, first resistance may be equal to the second resistance.

Yet another example is alight control system comprising: alight controller defining a differential-signal pair comprising a first conductor and a second conductor; and a driver module coupled to the light controller by way of the differential-signal pair. The driver module may include a differential-signal receiver comprising: an IN+ terminal coupled to the first conductor, an IN− terminal coupled to the second conductor, an OUT+ node, and an OUT− node; a first resistor having a first resistance, the first resistor coupled between the IN+ terminal and the OUT+ node; a second resistor having a second resistance, the second resistor coupled between the IN− terminal and the OUT− node; a first transistor having first connection coupled to the OUT+ node, a second connection coupled to a reference voltage, and a control input; a second transistor having first connection coupled to the OUT− node, a second connection coupled to the reference voltage, and a control input coupled to the control input of the first transistor; and a selector circuit defining a plus port coupled to the OUT+ node, a minus port coupled to the OUT− node, and a mirror output coupled to the control input of the first transistor. The selector circuit may be configured to, when a common-mode voltage on the IN+ and the IN− terminal is positive, drive the mirror output proportional to a magnitude of the common-mode voltage.

In the example light control system, the selector circuit may further comprise: a third transistor having a first connection coupled to a voltage source, a second connection coupled to the mirror output, and a control input coupled to the OUT+ node; and a fourth transistor having a first connection coupled to the voltage source, a second connection coupled to the mirror output, and a control input coupled to the OUT− node. The third transistor may be an N-channel field effect transistor (FET), and the fourth transistor may be an N-channel FET.

In the example light control system, the differential-signal receiver may further comprise: a third resistor coupled between the voltage source and the first connection of the third transistor, the third resistor having a first matching resistance; a fourth resistor coupled between the voltage source and the first connection of the fourth transistor, the fourth resistor having a second matching resistance; and the differential-signal receiver configured to reproduce a differential signal received on the IN+ terminal and the IN− terminal across the first connection of the third transistor and the first connection of the fourth transistor.

In the example light control system, the differential-signal receiver may further comprise a bias circuit, the bias circuit comprising: a positive-drive output coupled to the OUT+ node; a negative-drive output coupled to the OUT− node; and a sense input coupled to the mirror output. The bias circuit may be configured to, when the common-mode voltage is below a predetermined threshold, drive a bias current to the OUT+ node and drive a bias current to the OUT− node, the bias currents proportion to an amount the magnitude of the common-mode voltage is below the predetermined threshold.

In the example light control system, the first resistance may be equal to the second resistance.

BRIEF DESCRIPTION OF THE DRAWINGS

For a detailed description of example embodiments, reference will now be made to the accompanying drawings in which.

DEFINITIONS

Figure 1:
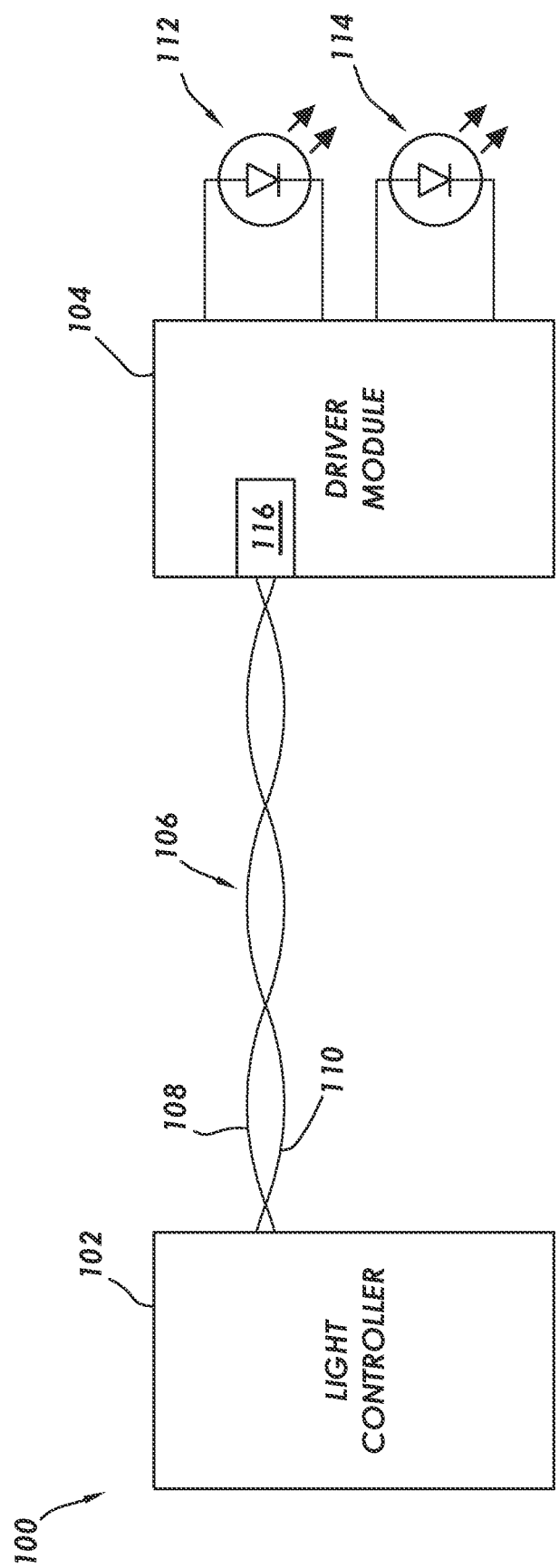
FIG. 1 shows a light control system in accordance with at least some embodiments.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

The terms "input" and "output" when used as nouns refer to connections (e.g., electrical, software), and shall not be read as verbs requiring action. For example, a timer circuit may define a clock output. The example timer circuit may create or drive a clock signal on the clock output. In systems implemented directly in hardware (e.g., on a semiconductor substrate), these "inputs" and "outputs" define electrical connections. In systems implemented in software, these "inputs" and "outputs" define parameters read by or written by, respectively, the instructions implementing the function.

"Assert" shall mean changing the state of a Boolean signal. Boolean signals may be asserted high or with a higher voltage, and Boolean signals may be asserted low or with a lower voltage, at the discretion of the circuit designer. Similarly, "de-assert" shall mean changing the state of the Boolean signal to a voltage level opposite the asserted state.

"About" in relation to a recited value shall mean the recited value plus or minus (+/−) 10 percent (10%). "About" in relation to a comparison of two values (e.g. two resistances) shall mean that the lower values falls within a range being plus or minus (+/−) 10 percent (10%) of the higher value.

"Controller" shall mean, alone or in combination, individual circuit components, an application specific integrated circuit (ASIC), a microcontroller with controlling software, a reduced-instruction-set computing (RISC) with controlling software, a digital signal processor (DSP), a processor with controlling software, a programmable logic device (PLD), or a field programmable gate array (FPGA), configured to read inputs and drive outputs responsive to the inputs.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various examples are directed to methods and systems of differential-signal receivers. More particularly, various examples are directed to differential-signal receivers operable in situations in which the common-mode voltage on a differential-signal pair is not only between the reference voltage (e.g., common, ground) and the supply voltage for the differential-signal receiver, but also in situations in which the common-mode voltage is above the supply voltage and/or below the reference voltage for the differential-signal receiver (i.e., negative). More particularly still, when the common-voltage is positive, at any given point during differential signaling various examples clamp the more positive output node at a clamp voltage independent of the magnitude of the common-mode voltage. When the common-voltage is negative, at any given point during the differential signaling, again the various examples clamp the more positive output node at a clamp voltage independent of the magnitude of the common-mode voltage. The specification first turns to an example implementation to orient the reader.

FIG. 1 shows an example light control system. In particular, the light control system 100 comprises a light controller 102 coupled to a driver module 104 by way of a differential-signal pair 106. The example differential-signal pair 106 comprises an electrical conductor 108 twisted with respect to an electrical conductor 110, and thus sometimes the differential-signal pair 106 is referred to as a twisted-pair cable. In other cases, the differential signal pair 106 may be traces (e.g., parallel traces) on a circuit board, or traces being part of a flexible ribbon connector. While the example of FIG. 1 shows a single differential-signal pair 106 coupled between the light controller 102 and the driver module 104, depending on the bandwidth of communications used between the light controller 102 and the driver module 104, or to implement communication redundancy in case of failure, more than one differential-signal pair may be used. Moreover, the light controller 102 may couple to many distinct driver modules, but only one driver module is shown in FIG. 1 so as not to unduly complicate the discussion.

The driver module 104 is coupled to a plurality of light emitting diodes (LEDs). In particular, the example light control system 100 comprises an LED 112 and an LED 114. While only two LEDs are shown, the driver module 104 may couple to one or more LEDs, such as LEDs of an automobile. The LEDs 112 and 114 may be examples of any one of a number LEDs in an automotive system, such as decorative lighting, interior/exterior lighting, turn signals, running lights, brake lights, and headlights. Thus, the light controller 102 communicates with the driver module 104 to command turning on and off the LEDs 112 and 114 as desired within the context of operation of an automobile. The automotive context is merely an example.

In the data communication system operated across the differential-signal pair 106, the light controller 102 may digitally communicate by driving differential signals across the differential-signal pair 106. For example, the light controller 102 may drive differential signals in the range of 200 to 1200 millivolts (mV) across the differential-signal pair 106. That is, in one operational state the electrical conductor 108 may be driven from about 200 to about 1200 mV higher than the electrical conductor 110, and in the opposite state the electrical conductor 110 may be driven from about 200 to about 1200 mV higher than the electrical conductor 108.

Still referring to FIG. 1, the example light control system 100, and particularly the driver module 104, comprises a differential-signal receiver 116. The differential-signal receiver 116 is coupled to the electrical conductors of the differential-signal pair 106. The differential-signal receiver 116 is designed and constructed to detect or receive differential signals in spite of any common-mode voltage induced on and/or carried by the differential-signal pair 106. More particularly, the example differential-signal receiver 116 may detect differential signals in spite of the common-mode voltage exceeding a supply voltage of the differential-signal receiver 116, and in spite of the common-mode voltage falling below a reference voltage of the differential-signal receiver 116. More particularly still, in example cases the differential-signal receiver 116 detects zero-crossings of the differential signal.

Common-mode voltage is a voltage induced and/or simultaneously carried on both electrical conductors of the differential-signal pair 106. The differential signal driven by the light controller 102 may thus "ride" on the common-mode voltage. More specifically, the common-mode voltage can be considered to be the average value of the voltage on the electrical conductor 108 (with respect to common or ground) and the voltage of the electrical conductor 110 (with respect to common or ground).

Figure 2:
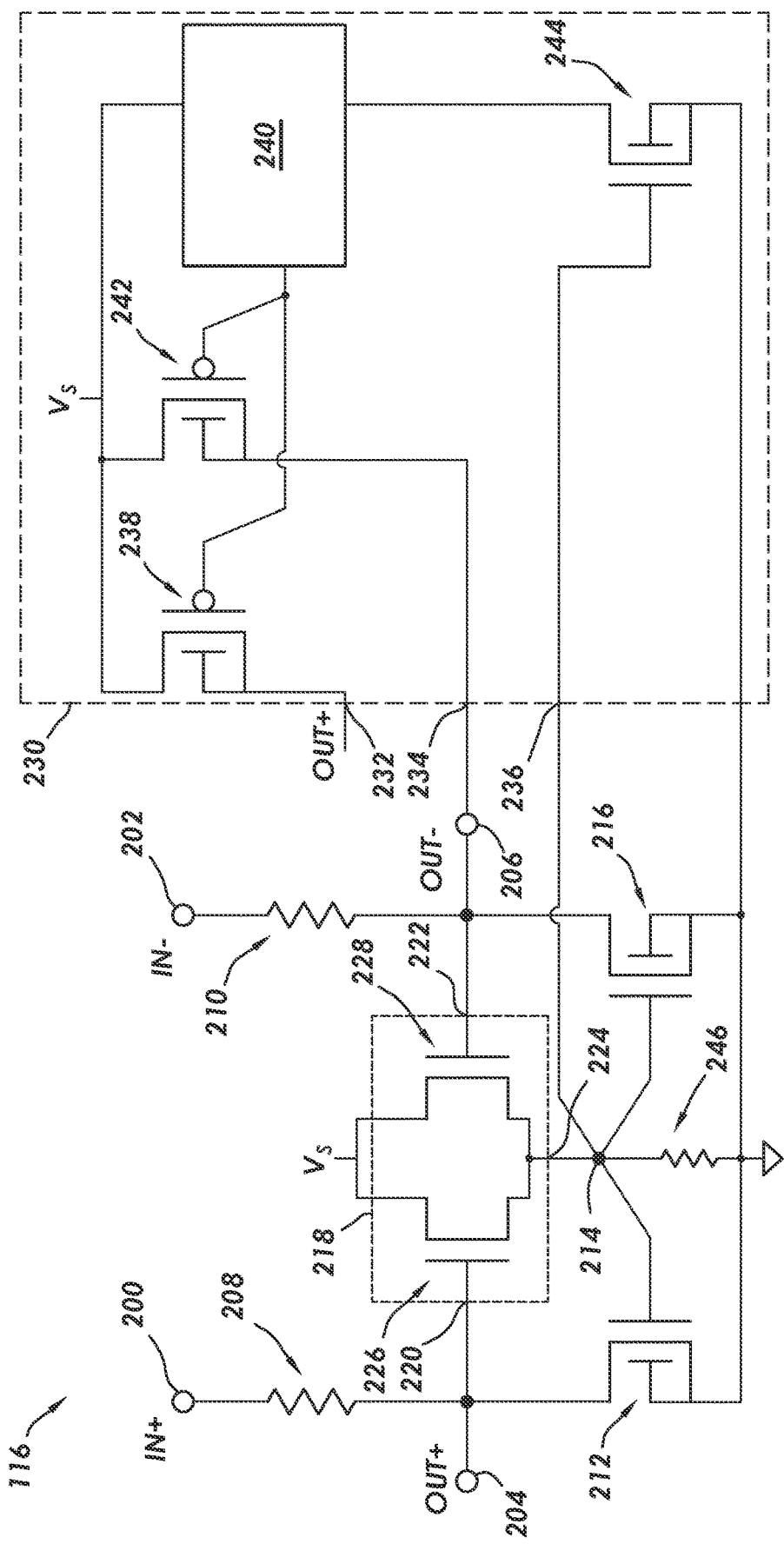
FIG. 2 shows a circuit diagram of a differential-signal receiver in accordance with at least some embodiments.

FIG. 2 shows a circuit diagram of an example differential-signal receiver 116. In particular, the example differential-signal receiver 116 defines an IN+ terminal 200, an IN− terminal 202, an OUT+ node 204, and an OUT− node 206. The IN+ terminal 200 is coupled to a first conductor of the differential-signal pair 106 (FIG. 1), and the IN− terminal 202 is coupled to a second conductor of the differential-signal pair 106. Thus, the differential-signal receiver 116 receives differential signals across the IN+ terminal 200 and the IN− terminal 202, with the differential signals received along with or "riding" the common-mode voltage induced and/or carried on the differential-signal pair 106. In example systems, the differential signals are extracted from the IN+ terminal 200 and IN− terminal 202, and appear un-attenuated across the OUT+ node 204 and the OUT− node 206 with the common-mode voltage reduced or removed. For example, when the differential signal driven by the light controller 102 (FIG. 1) makes the IN+ terminal 200 carry a higher voltage than the IN− terminal 202, the OUT+ node 204 will have a higher voltage than the OUT− node 206. Oppositely, when the differential signal driven by the light controller 102 makes the IN− terminal 202 carry a higher voltage than the IN+ terminal 200, the OUT− node 206 will have a higher voltage than the OUT+ node 204. Thus, downstream circuits (not shown) detect and receive the differential signal, and decode the encoded communication.

The example differential-signal receiver 116 further comprises a resistor 208 having a resistance, and the resistor 208 coupled between the IN+ terminal 200 and the OUT+ node 206. Similarly, a resistor 210 having a resistance is coupled between the IN− terminal 202 and the OUT− node 206. In example cases, the resistance of the resistor 208 is about the same as the resistance of resistor 210, such as within manufacturing tolerances.

Still referring to FIG. 2, the differential-signal receiver 116 further comprises a transistor having first connection coupled to the OUT+ node 204, a second connection coupled to a reference voltage (e.g., ground, common), and a control input coupled to a mirror node 214. In the example, the transistor is shown as a field effect transistor (FET), and in particular an N-channel FET, and is hereafter referred to as FET 212; however, other types of FETs may be used, and other types of transistors (e.g., junction transistors) may be used. In the example case of the FET 212, the drain is coupled to the OUT+ node, the source is coupled to the reference voltage, and the gate is coupled to the mirror node 214. The example circuit further comprises a transistor having first connection coupled to the OUT− node 206, a second connection coupled to the reference voltage, and a control input coupled to the mirror node 214 and the control input of the transistor 212. As before, the transistor is shown as a FET, and in particular an N-channel FET, and is hereafter referred to as FET 216; however, other types of FETs may be used, and other types of transistors (e.g., junction transistors) may be used. In the example case of the FET 216, the drain is coupled to the OUT− node, the source is coupled to the reference voltage, and the gate is coupled to the mirror node 214. In example cases, the transistors 212 and 216 have the same characteristics (e.g., conduction area and gain), such as may be achieved within manufacturing tolerances.

The example differential-signal receiver 116 further comprises a selector circuit 218 defining a plus port 220 coupled to the OUT+ node 204, a minus port 222 coupled to the OUT− node 206, and a mirror output 224 coupled to the mirror node 214. As will be discussed in greater detail below, the example selector circuit 218 is designed and constructed such that, when a common-mode voltage on the IN+ terminal 200 and the IN− terminal 202 is positive, the selector circuit 218 drives the mirror output 224 proportional to a magnitude of the common-mode voltage, and in some cases proportional to the higher of the voltages of the OUT+ node 204 or the OUT− node 206. The signal driven to the mirror node 214 by the mirror output 224 causes mirror currents to flow through each of the FET 212 and FET 216. The respective mirror currents through the FETs 212 and 216 enable current flow through the respective resistors 208 and 210. At certain times, the current through resistors 208 and 210 cause respective voltage drops across the resistors such that the common-mode voltage at the OUT+ node 204 and the OUT− node 206 is reduced to a level close to ground potential, leaving the differential signal to appear across the OUT+ node 204 and the OUT− node 206.

In the example of FIG. 2, the selector circuit comprises a transistor having a first connection coupled to a voltage source $V_S$, a second connection coupled to the mirror output 224, and a control input defining the plus port 220 and thus coupled to the OUT+ node 204. The example transistor is shown as a FET, and in particular an N-channel FET, hereafter referred to as FET 226; however, other types of transistors (e.g., junction transistors) may be used. In the case of the FET 226, the drain is coupled to the voltage source $V_S$, the source is coupled to the mirror output 224, and the gate defines the plus port 220. The example selector circuit 218 further comprises a transistor having a first connection coupled to the voltage source $V_S$, a second connection coupled to the mirror output 224, and a control input defining the minus port 222 and thus coupled to the OUT− node 206. The example transistor is shown as a FET, and in particular an N-channel FET, hereafter referred to as FET 228; however, other types of transistors (e.g., junction transistors) may be used. In the case of the FET 228, the drain is coupled to the voltage source $V_S$, the source is coupled to the mirror output 224, and the gate defines the minus port 222. As will be discussed in greater detail below, the FETs 226 and 228 are selected such that, when a common-mode voltage on the IN+ terminal 200 and the IN− terminal is positive, one or both of the FETs 226 and 228 drives the mirror output 224 with a current proportional to a magnitude of the common-mode voltage. The current supplied to the mirror output 224 creates a voltage on the control inputs of the FETs 212, 216, and 244 by way of the current flowing through resistor 246 to the reference voltage.

Still referring to FIG. 2, the example differential-signal receiver 116 further comprises a bias circuit 230. The example bias circuit 230 defines a positive-drive output 232 coupled to the OUT+ node 204 (the connection not specifically shown in the figure, but indicated by the OUT+ wording by the positive-drive output 232), a negative-drive output 234 coupled to the OUT− node 206, a sense input 236 coupled to the mirror node 214, and a connection to the reference voltage. The bias circuit 230 is designed and constructed such that, when the common-mode voltage is below a predetermined threshold, the bias circuit 230 drives a bias current to the OUT+ node 204 and drives a bias current to the OUT− node 206, the bias currents proportion to an amount the magnitude of the common-mode voltage is below the predetermined threshold. In example cases the predetermined threshold is a positive value (e.g. a few volts above zero), and the magnitude of the common-mode voltage may be negative in some cases. The amount the magnitude of the common-mode voltage is below the predetermined threshold may be the sum of the absolute value of the magnitude plus the value of the predetermined threshold.

The example bias circuit 230 comprises a transistor having first connection coupled to the voltage source $V_S$, a second connection coupled to the OUT+ node 204, and a control input coupled to a bias controller 240. The example transistor is shown as a FET, and in particular a P-channel FET, hereafter referred to as FET 238; however, other types of FETs may be used, and other types of transistors (e.g., junction transistors) may be used. In the case of the FET 238, the source is coupled to the voltage source $V_S$, the drain is coupled to the positive-drive output 232, and the gate is coupled to a bias controller 240. The example bias circuit 230 further comprises a transistor having first connection coupled to the voltage source $V_S$, a second connection coupled to the OUT− node 206, and a control input coupled to the bias controller 240. In the example, the transistor is shown as a FET, and in particular a P-channel FET, hereafter referred to as FET 242; however, other types of FETs may be used, and other types of transistors (e.g., junction transistors) may be used. In the case of the FET 242, the source is coupled to the voltage source $V_S$, the drain is coupled to the negative-drive output 234, and the gate is coupled to the bias controller 240. As will be discussed in greater detail below, the FETs 238 and 242 provide bias currents to the OUT+ node 204 and OUT− node 206 during certain operating conditions (e.g., when the common-mode voltage is below the predetermined threshold).

In order to sense the state of the differential-signal receiver 116 as it relates to the common-mode voltage, the example bias circuit 230 has a transistor having a first connection coupled to the bias controller 240, a second connection coupled to the reference voltage, and a control input coupled to the mirror node 214. In the example, the transistor is shown as a FET, and in particular an N-channel FET, hereafter referred to as FET 244; however, other types of FETs may be used, and other types of transistors (e.g., junction transistors) may be used. In the case of the FET 244, the drain is coupled to the bias controller 240, the drain is coupled to the reference voltage, and the gate is coupled to the mirror node 214. In the example arrangement, the currents through the selector circuit 218 likewise create mirror current through the FET 244, and based on the magnitude of the mirror current the bias controller 240 may detect the magnitude of the common-mode voltage, and drive the bias currents through the FETs 238 and 242 accordingly. The bias controller 240 may take any suitable form to detect the mirror current through the FET 244 and drive the control inputs of the FETs 238 and 240.

The specification now turns to a series of example situations or states encountered by the differential-signal receiver 116. The discussion starts with working through operation of the differential-signal receiver 116 when the differential signal applied to the IN+ terminal 200 and the IN− terminal 202 is zero or close to zero, and as the common-mode voltage on differential-signal pair 106 (FIG. 1) swings from being above the supply voltage $V_S$, to below the predetermined threshold but above the reference voltage, and then below the common or ground.

Figure 3:
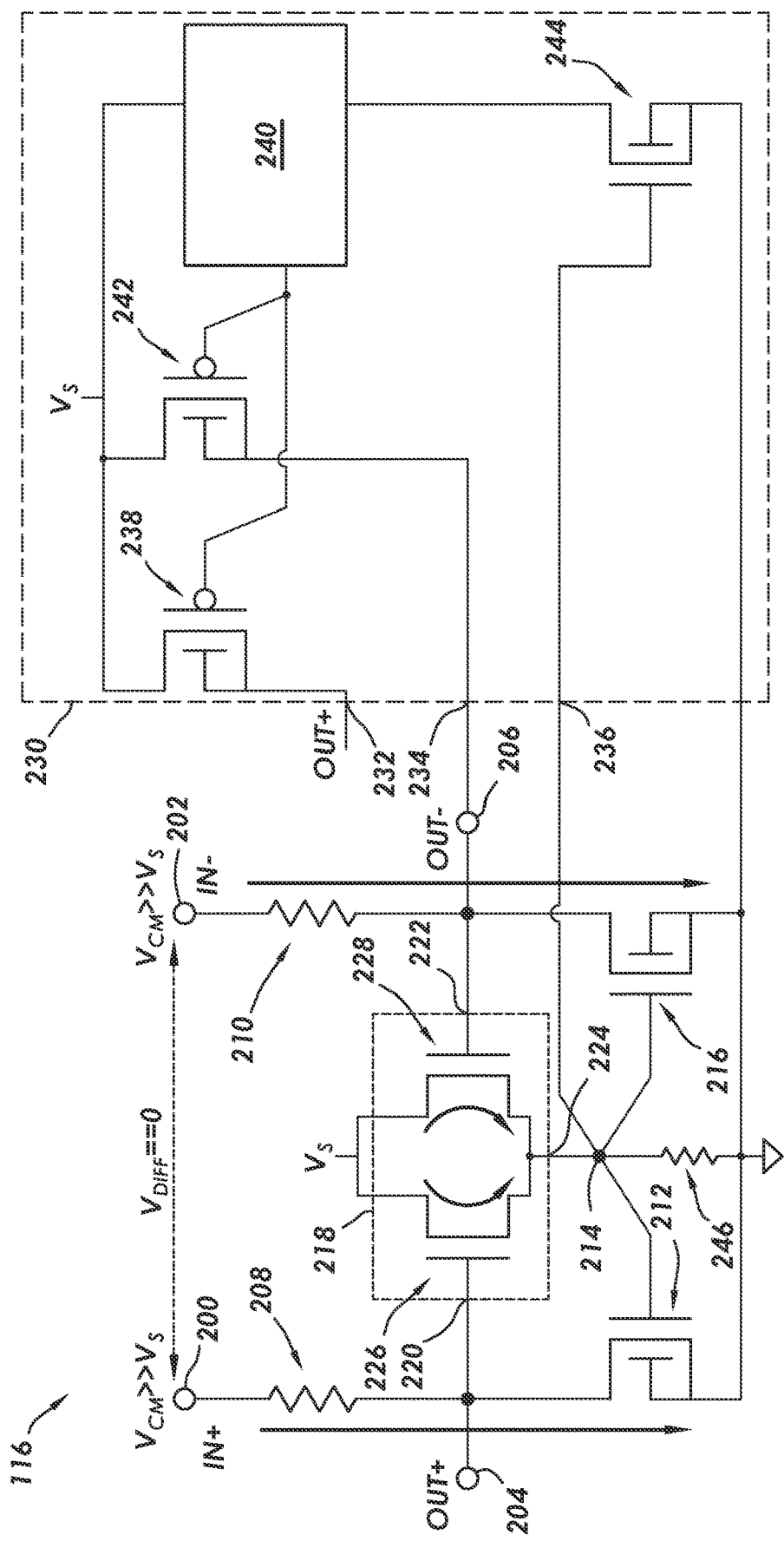
FIG. 3 shows a circuit diagram of a differential-signal receiver, annotated to show a high common-mode voltage, and in accordance with at least some embodiments.

FIG. 3 shows a circuit diagram of a differential-signal receiver, annotated to show a high common-mode voltage. In particular, in the example state the differential signal applied across the IN+ terminal 200 and the IN− terminal 202 is zero (indicated as "$V_{DIFF}=0$" in the figure), the IN+ terminal 200 has a positive common-mode voltage greater than the source voltage $V_S$ (indicated as "$V_{CM} \gg V_S$" in the figure), and the IN− terminal 202 has the positive common-mode voltage greater than the source voltage $V_S$ (also indicated as "$V_{CM} \gg V_S$" in the figure). The common-mode voltage on the IN+ terminal 200 initially drives a voltage to the OUT+ node 204, and the voltage is thus applied to the control input of the FET 226. The voltage thus creates a current flow through the FET 226 as shown, the current flow provided to the mirror node 214. Similarly, the common-mode voltage on the IN− terminal 202 initially drives a voltage to the OUT− node 206, and the voltage is thus applied to the control input of the FET 228. The voltage thus creates a current flow through the FET 228 as shown, the current flow provided to the mirror node 214. The voltage induced at the mirror node 214 by the transistors of the selector circuit 218 create a mirror current through resistor 208 and then the FET 212 as shown. Likewise, the voltage induced at the mirror node 214 by the transistors of the selector circuit 218 creates a mirror current through the resistor 210 and then the FET 216 as shown. In this example in which the differential signal applied across the IN+ terminal 200 and the IN− terminal 202 is zero, the magnitudes of the mirror currents will be about equal.

In the state shown in FIG. 3, the system very quickly reaches an equilibrium state in which the voltage at the OUT+ node 204 is clamped at a clamp voltage being the sum of the gate-to-source voltage of the FET 226 and the gate-to-source voltage of the FET 212. Similarly in the equilibrium state, the voltage at the OUT− node 206 is clamped at a clamp voltage being the sum of the gate-to-source voltage of the FET 228 and the gate-to-source voltage of the FET 216. Stated differently, the mirror current through the resistor 208 causes a voltage drop such that, regardless of the high positive magnitude of the common-mode voltage at the IN+ terminal 200, the voltage at the OUT+ node 204 is clamped at two gate-to-source voltage drops. The mirror current through the resistor 210 causes a similar voltage drop with respect to the OUT− node 206.

Still referring to FIG. 3, in the example state the bias circuit 230 senses that the common-mode voltage is above a predetermined threshold, as sensed by a mirror current through the FET 244. Thus, the example bias controller 240 thus provides no current to the OUT+ node and OUT− node.

Figure 4:
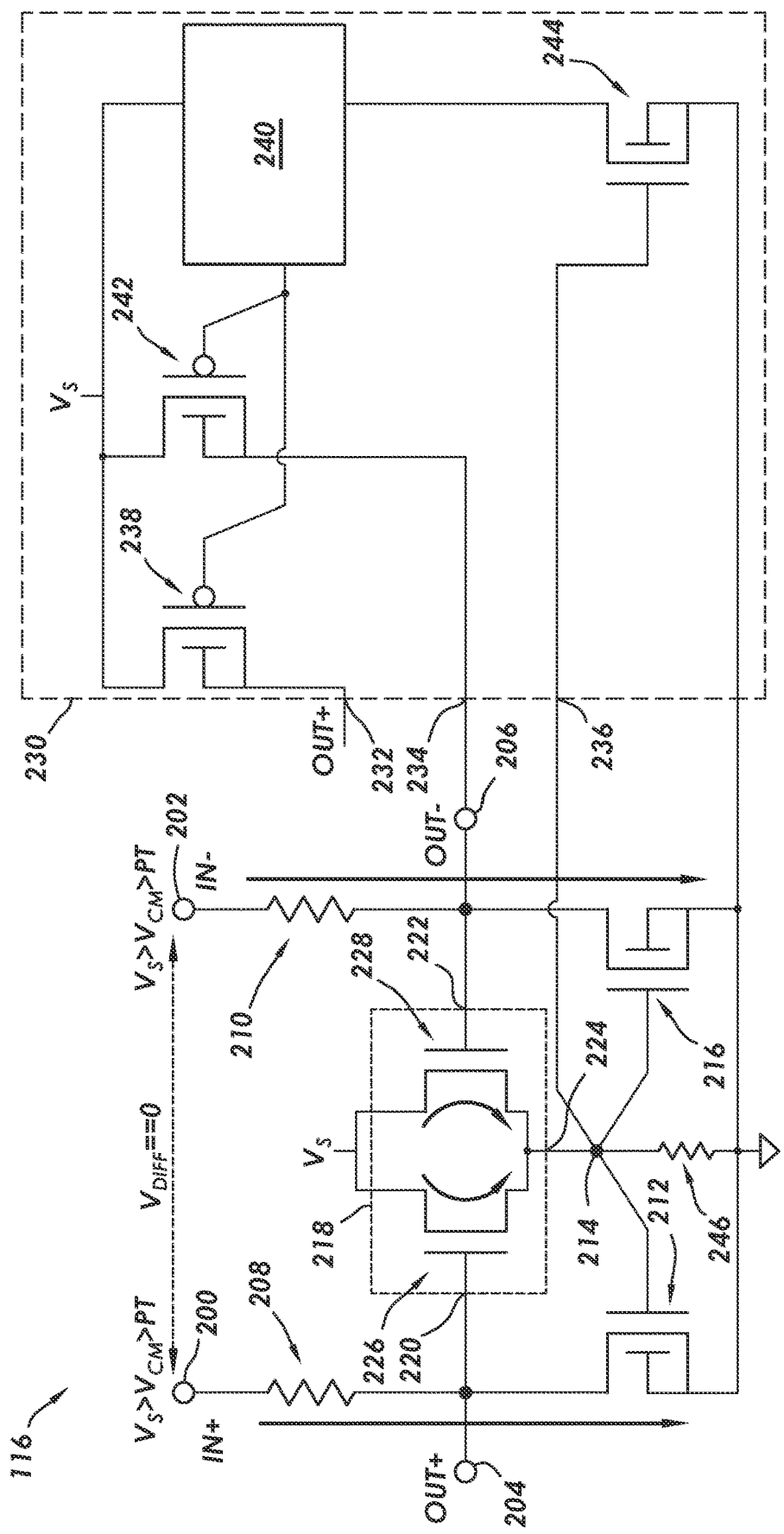
FIG. 4 shows a circuit diagram of a differential-signal receiver, annotated to show the common-mode voltage lower than voltage source and above a predetermined threshold, and in accordance with at least some embodiments.

FIG. 4 shows a circuit diagram of a differential-signal receiver, annotated to show a common-mode voltage lower than FIG. 3, but above a predetermined threshold. In particular, in the example state the differential signal applied across the IN+ terminal 200 and the IN− terminal 202 is still zero (indicated as "$V_{DIFF}=0$" in the figure), the IN+ terminal 200 has a positive common-mode voltage lower than the source voltage $V_S$ but above the predetermined threshold (indicated as "$V_S > V_{CM} > PT$" in the figure), and the IN− terminal 202 has a positive common-mode voltage lower than the source voltage $V_S$ but above the predetermined threshold (also indicated as "$V_S > V_{CM} > PT$" in the figure).

The common-mode voltage on the IN+ terminal 200 initially drives a voltage to the OUT+ node 204, and the voltage is thus applied to the control input of the FET 226. The voltage thus creates a current flow through the FET 226 as shown, the current flow provided to the mirror node 214.

Similarly, the common-mode voltage on the IN− terminal 202 initially drives a voltage to the OUT− node 204, and the voltage is thus applied to the control input of the FET 228. The voltage thus creates a current flow through the FET 228 as shown, the current flow provided to the mirror node 214. The voltage induced at the mirror node 214 by the transistors of the selector circuit 218 creates a mirror current through FET 212 and then the resistor 208, as shown. Likewise, the voltage induced at the mirror node 214 by the transistors of the selector circuit 218 create a mirror current through the resistor 210 and then the FET 216, as shown. In this example in which the differential signal applied across the IN+ terminal 200 and the IN− terminal 202 is zero, the magnitudes of the mirror currents will be about equal. Moreover, given that the common-mode voltage is lower in FIG. 4 than in the state of FIG. 3, the respective currents through the resistors 208 and 210 in FIG. 4 will have a lower magnitude than the currents of FIG. 3.

In the state shown in FIG. 4, the system again very quickly reaches an equilibrium state in which the voltage at the OUT+ node 204 is clamped at a clamp voltage being the sum of the gate-to-source voltage of the FET 226 and the gate-to-source voltage of the FET 212. Similarly in the equilibrium state, the voltage at the OUT− node 206 is clamped at a clamp voltage being the sum of the gate-to-source voltage of the FET 228 and the gate-to-source voltage of the FET 216. Stated differently, the mirror current through the resistor 208 causes a voltage drop such that, regardless of the positive magnitude of the common-mode voltage at the IN+ terminal 200, the voltage at the OUT+ node 204 is clamped at two gate-to-source voltage drops. The mirror current through the resistor 210 causes a similar or identical voltage drop with respect to the OUT− node 206. In the example state, the bias circuit 230 senses that the common-mode voltage is above a predetermined threshold, as sensed by a mirror current through the FET 244. The example bias controller 240 thus provides no current to the OUT+ node and OUT− node.

Figure 5:
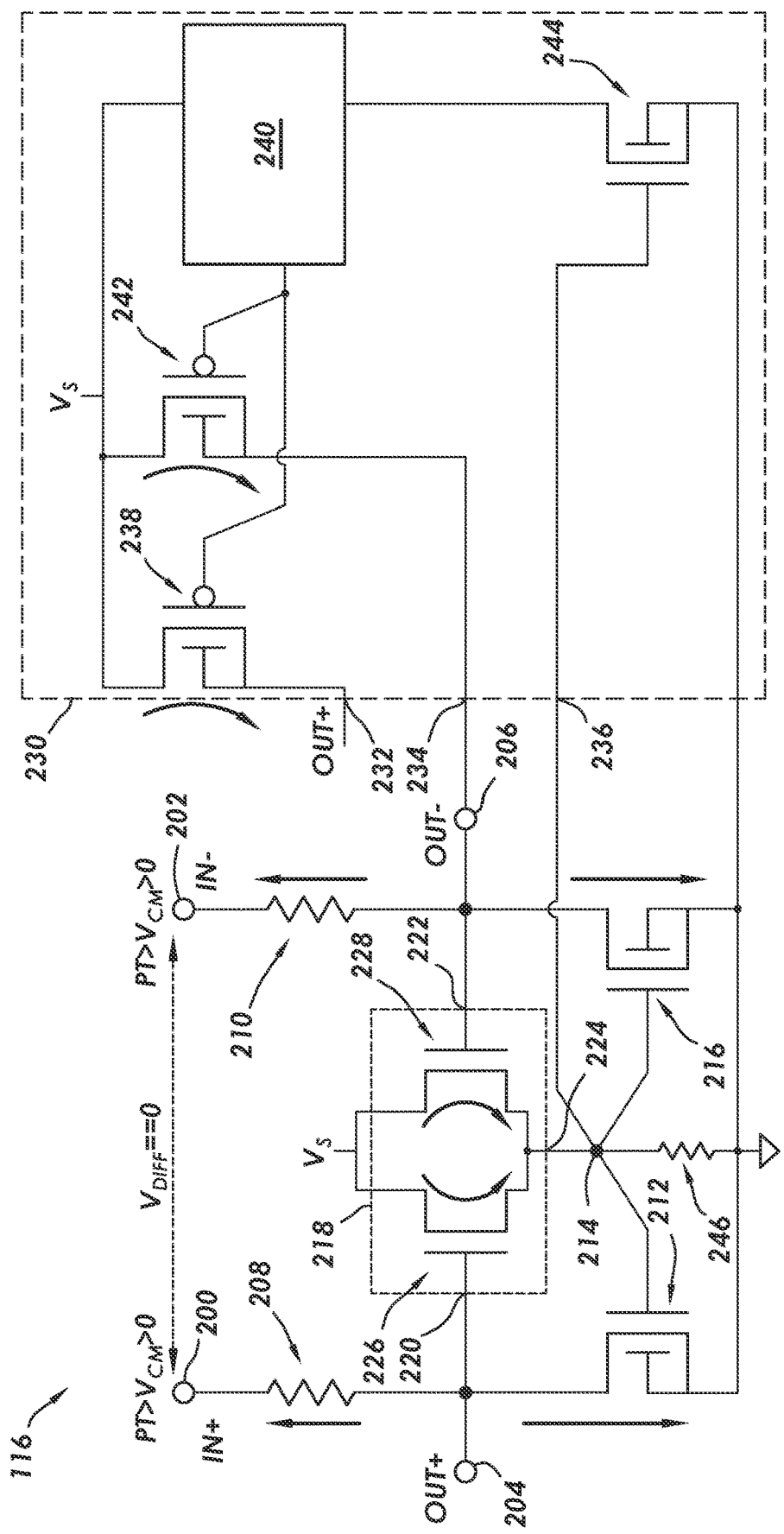
FIG. 5 shows a circuit diagram of a differential-signal receiver, annotated to show the common-mode voltage lower than the predetermined threshold and above zero, and in accordance with at least some embodiments.

FIG. 5 shows a circuit diagram of a differential-signal receiver, annotated to show a common-mode voltage lower the predetermined threshold and above zero. In particular, in the example state the differential signal applied across the IN+ terminal 200 and the IN− terminal 202 is still zero (indicated as "$V_{DIFF}=0$" in the figure), the IN+ terminal 200 has a positive common-mode voltage lower than the predetermined threshold and above zero (indicated as "PT>$V_{CM}$>0" in the figure), and the IN− terminal 202 has a positive common-mode voltage lower than the source voltage $V_S$ but above the predetermined threshold (also indicated as "PT>$V_{CM}$>0" in the figure).

The common-mode voltage on the IN+ terminal 200 initially drives a voltage to the OUT+ node 204, and the voltage is thus applied to the control input of the FET 226. The voltage thus creates a current flow through the FET 226 as shown, the current flow provided to the mirror node 214. Similarly, the common-mode voltage on the IN− terminal 202 initially drives a voltage to the OUT− node 206, and the voltage is thus applied to the control input of the FET 228. The voltage thus creates a current flow through the FET 228 as shown, the current flow provided to the mirror node 214. The voltage at the mirror node 214 creates a mirror current through the FET 244 of the bias circuit 230. In this case, the bias circuit 230, and in particular the bias controller 240, senses that the common-mode voltage is below the predetermined threshold, and thus the bias circuit 230 provides a bias current through the FET 238 to the OUT+ node 204, and provides a bias current through the FET 242 to the OUT− node 206. Stated otherwise, the bias circuit 233 (byway of FET 244) senses the gate voltage of the FETs 212 and 216, and when the gate voltages are below a predetermined value (indicating the current in FETS 226 and 228 are close to zero), bias controller 240 increases current level by injecting at the OUT+ node 204 and OUT− node 206. The magnitude of the bias currents through the FETs 238 and 242 are about the same, and the magnitudes are proportional to an amount the common-mode voltage is below the predetermined threshold. Note how the current through resistors 208 and 210 is reversed compared to the previous situations.

Further, the voltage induced at the mirror node 214 by the transistors of the selector circuit 218 create mirror currents through the FET 212 as shown and the FET 216 as shown, which are about equal. Once again, the system very quickly reaches an equilibrium state in which the voltage at the OUT+ node 204 is clamped at the clamp voltage being the sum of the gate-to-source voltage of the FET 226 and the gate-to-source voltage of the FET 212. Similarly in the equilibrium state, the voltage at the OUT− node 206 is clamped at the clamp voltage being the sum of the gate-to-source voltage of the FET 228 and the gate-to-source voltage of the FET 216. Stated differently, the bias current causes a voltage such that, regardless of the magnitude of the common-mode voltage at the IN+ terminal 200, the voltage at the OUT+ node 204 is clamped at two gate-to-source voltage drops. The bias current in the right half of the circuit causes a similar voltage with respect to the OUT− node 206.

Figure 6:
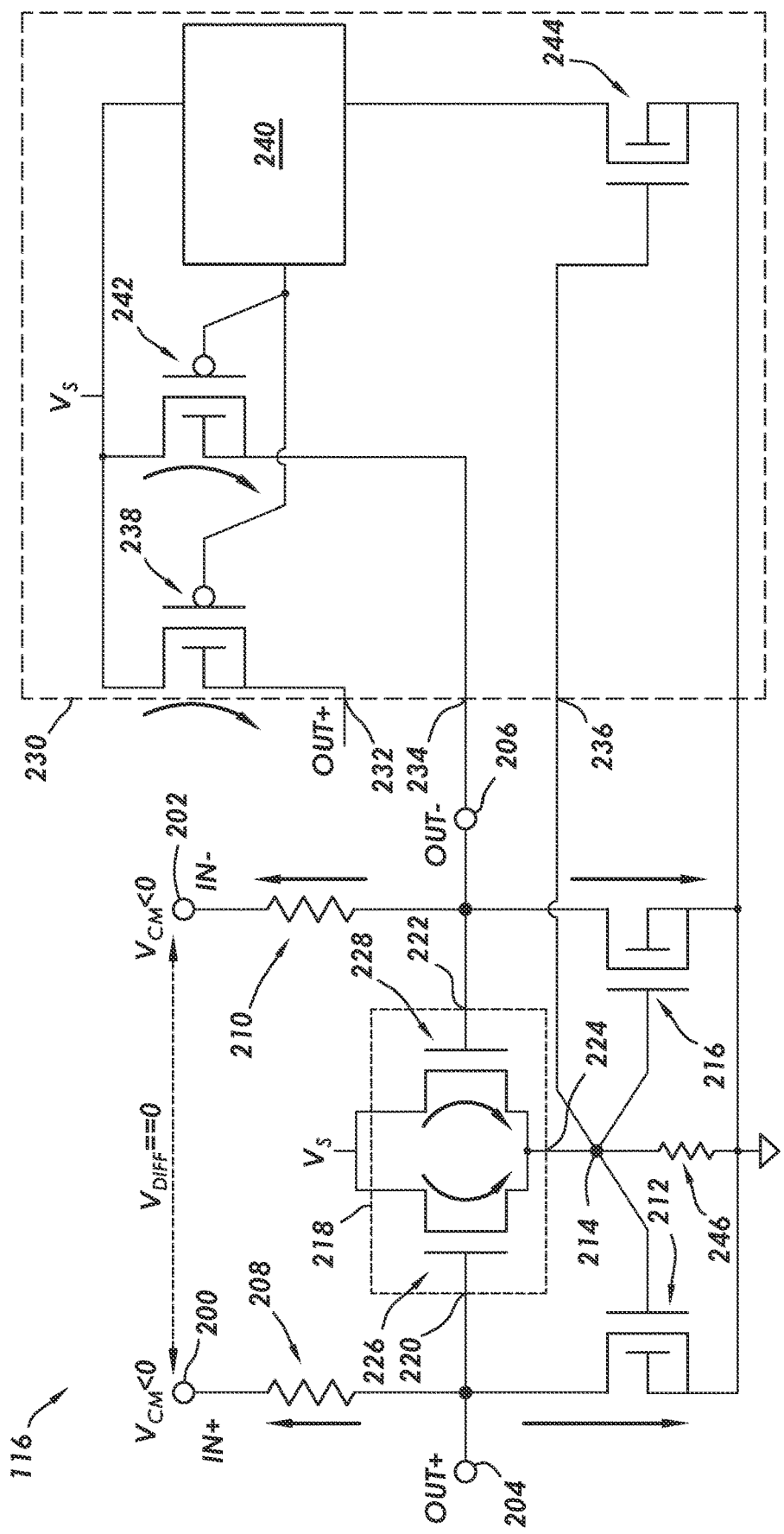
FIG. 6 shows a circuit diagram of a differential-signal receiver, annotated to show the common-mode voltage below zero, and in accordance with at least some embodiments.

FIG. 6 shows a circuit diagram of a differential-signal receiver, annotated to show a common-mode voltage less than zero (i.e., negative). In particular, in the example state the differential signal applied across the IN+ terminal 200 and the IN− terminal 202 is still zero (indicated as "$V_{DIFF}=0$" in the figure), the IN+ terminal 200 has a negative common-mode voltage (indicated as "$V_{CM}$<0" in the figure), and the IN− terminal 202 has a negative common-mode voltage (also indicated as "$V_{CM}$<0" in the figure).

With common-mode voltage on the IN+ terminal 200 being negative, initially the voltage on the mirror node 214 is low, and thus the bias circuit 230 senses that the common-mode voltage is below the predetermined threshold. Stated otherwise, the bias circuit 233 (by way of FET 244) senses the gate voltage of the FETs 212 and 216 are below the predetermined value. The bias circuit 230 thus ramps the bias current provided to the OUT+ node 204 and the bias current provided to the OUT− node 206 until the voltage at the mirror node 214 reaches a predetermined value. The bias currents through the FET 238 and FET 242 are again shown in FIG. 6.

The bias current provided to the OUT+ node 204 drives a voltage to the control input of the FET 226. The voltage thus creates a current flow through the FET 226 as shown, the current flow provided to the mirror node 214. Similarly, the bias current provided to the OUT− node 206 drives a voltage to the control input of the FET 228. The voltage thus creates a current flow through the FET 228 as shown, the current flow provided to the mirror node 214. The voltage at the mirror node 214 creates a mirror current through the FET 244 of the bias circuit 230. With the bias circuit 230 attempting to reach and hold the mirror node 214 at the predetermined value, the circuit quickly reaches an equilibrium state in which the voltage at the OUT+ node 204 is clamped at the clamp voltage being the sum of the gate-to-source voltage of the FET 226 and the gate-to-source voltage of the FET 212. As before, in this example the magnitude of the bias currents through the FETs 238 and 242 are about the same (thanks to the common gate voltage), and it follows that the magnitudes of the bias currents are proportional to an absolute value of the magnitude of the common-mode voltage (plus magnitude of the predetermined threshold). Stated differently, the bias current flow causes a voltage such that, regardless of the negative magnitude of the common-mode voltage at the IN+ terminal 200, the voltage at the OUT+ node 204 is two gate-to-source voltage drops. The bias current flow in the right half of the circuit causes a similar voltage with respect to the OUT− node 206.

Summarizing before continuing, the example differential-signal receiver 116 addresses common-mode voltages ranging from being in excess of the voltage source $V_S$ to being negative (i.e., lower than the reference voltage). In cases in which the common-mode voltage is above the predetermined threshold, the example differential-signal receiver 116 causes mirror current flows in FETs 212 and 216 such that the voltages at the OUT+ node 204 and the OUT− node 206 are clamped at two gate-to-source voltages. In cases in which the common-mode voltage is below the predetermined threshold, including cases in which common-mode voltage is negative, the example differential-signal receiver 116 drives bias currents to the OUT+ node 204 and OUT− node 206 to again clamp the OUT+ node 204 and the OUT− node 206 at two gate-to-source voltages. Thus, each bias current is proportional to a total amount the common-mode voltage is below the predetermined threshold. Notice also how the current direction in the resistors 208 and 210 changes as the common-mode voltage changes—for high common-mode voltage the current flows from the IN terminal to the OUT nodes, and for low common-mode voltage the current flows from the OUT terminals to the IN terminals. The specification now turns to considerations of the non-zero differential signals simultaneously applied with the various common-mode voltages.

Figure 7:
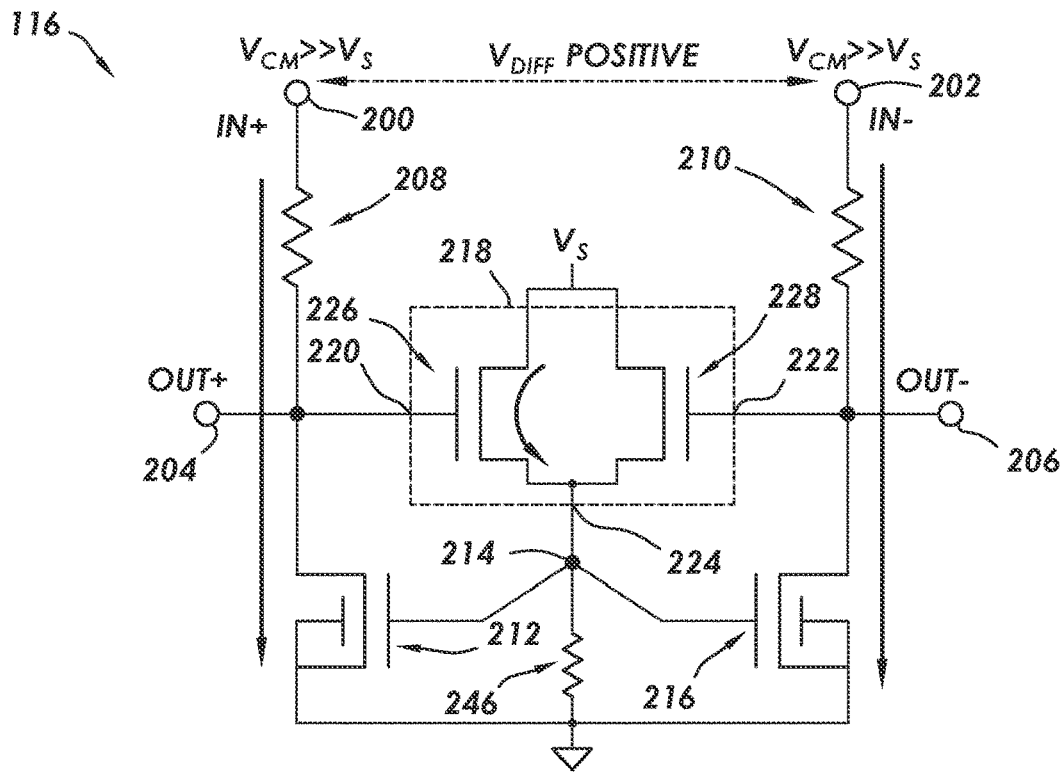
FIG. 7 shows a circuit diagram of a differential-signal receiver, annotated to show a high common-mode voltage and a positive differential signal, in accordance with at least some embodiments.

FIG. 7 shows a circuit diagram of a differential-signal receiver, annotated to show a high common-mode voltage and a positive differential signal. In particular, FIG. 7 shows the differential-signal receiver 116 in a shorthand notation, omitting the bias circuit 230 (FIG. 2), but with the understanding that the bias circuit 230 is still implemented. In the example state the differential signal applied across the IN+ terminal 200 and the IN− terminal 202 is positive (indicated as "$V_{DIFF}$ POSITIVE" in the figure). A "positive" differential signal is arbitrarily selected to mean the differential voltage applied is more positive on the IN+ terminal. The IN+ terminal 200 has a positive common-mode voltage greater than the source voltage $V_S$ (indicated as "$V_{CM} \gg V_S$" in the figure), and the IN− terminal 202 has a positive common-mode voltage greater than the source voltage $V_S$ (indicated as "$V_{CM} \gg V_S$" in the figure).

The common-mode voltage on the IN+ terminal 200 initially drives a voltage to the OUT+ node 204, and the voltage is thus applied to the control input of the FET 226. The voltage thus creates a current flow through the FET 226 as shown, the current flow provided to the mirror node 214. In this case, however, because the differential signal is positive and the IN+ terminal 200 has a higher voltage than the IN− terminal 202, the gate of the FET 228 has a lower voltage relative to the source, and thus the FET 228 is non-conductive or less conductive, depending on the magnitude of the differential signal $V_{DIFF}$.

The voltage induced at the mirror node 214 by FET 226 of the selector circuit 218 creates a mirror current through resistor 208 and the FET 212 as shown. Likewise, the voltage induced at the mirror node 214 by the FET 226 of the selector circuit 218 creates mirror current of about the same magnitude through resistor 210 and the FET 216 as shown. Because the voltage at the IN− terminal 202 is lower than the voltage at the IN+ terminal 200 as caused by the positive differential signal, and the current flow through the resistors 210 and FET 216 is about the same as the current in left half of the circuit, the voltage on the OUT+ node 204 is higher compared to the OUT− node 206, with the same value as the IN+ terminal 200 compared to the IN-terminal 202. Thus, in this example situation the OUT+ node 204 is clamped (e.g., at the two gate-to-source voltages), and the voltage at the OUT− node 206 will be lower proportional to the instantaneous differential voltage and reside between voltage at the OUT+ node 2004 and ground depending on the input voltage $V_{DIFF}$.

Figure 8:
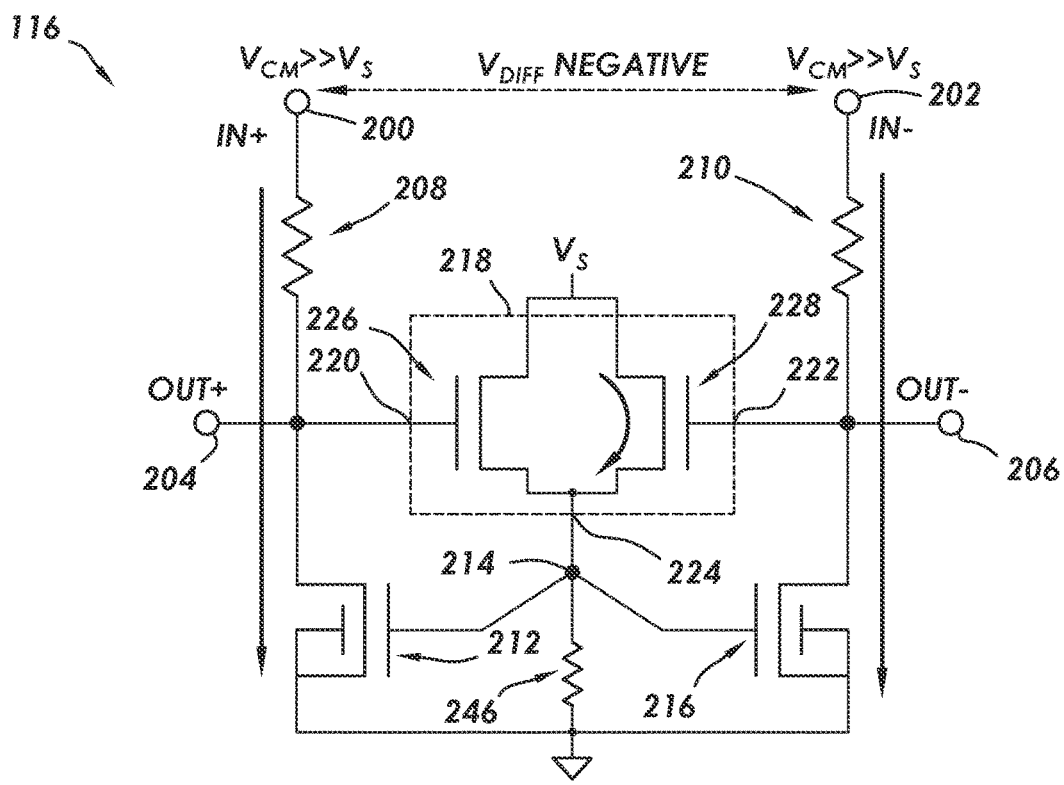
FIG. 8 shows a circuit diagram of a differential-signal receiver, annotated to show a high common-mode voltage and a negative differential signal, in accordance with at least some embodiments.

FIG. 8 shows a circuit diagram of a differential-signal receiver, annotated to show a high common-mode voltage and a negative differential signal. In particular, FIG. 8 shows the differential-signal receiver 116 in the shorthand notation. In the example state the differential signal applied across the IN+ terminal 200 and the IN− terminal 202 is negative (indicated as "$V_{DIFF}$ NEGATIVE" in the figure). The IN+ terminal 200 again has a positive common-mode voltage greater than the source voltage $V_S$ (indicated as "$V_{CM} \gg V_S$" in the figure), and the IN− terminal 202 again has a positive common-mode voltage greater than the source voltage $V_S$ (indicated as "$V_{CM} \gg V_S$" in the figure).

The common-mode voltage on the IN− terminal 202 initially drives a voltage to the OUT− node 206, and the voltage is thus applied to the control input of the FET 228. The voltage thus creates a current flow through the FET 228 as shown, the current flow provided to the mirror node 214. In this case, however, because the differential signal is negative and the IN− terminal 202 has a higher voltage than the IN+ terminal 200, the gate of the FET 226 has a lower voltage relative to the source, and thus the FET 226 is non-conductive (or less conductive).

The voltage induced at the mirror node 214 by FET 228 of the selector circuit 218 creates a mirror current through resistor 210 and the FET 216 as shown. Likewise, the voltage induced at the mirror node 214 by the FET 228 of the selector circuit 218 creates mirror current through resistor 208 and the FET 212 as shown. Because the voltage at the IN− terminal 202 is higher than the voltage at the IN+ terminal 200 as caused by the negative differential signal, and the current flow through the resistors 210 and FET 216 is about the same as the current in left half of the circuit, the voltage on the OUT+ node 204 is lower compared to the OUT− node 206, with the same value as the IN+ terminal 200 compared to the IN-terminal 202. Thus, in the example situation the OUT− node 206 is clamped (e.g., at the two gate-to-source voltages), and the voltage at the OUT+ node 204 will be lower proportional to the instantaneous differential voltage.

Figure 9:
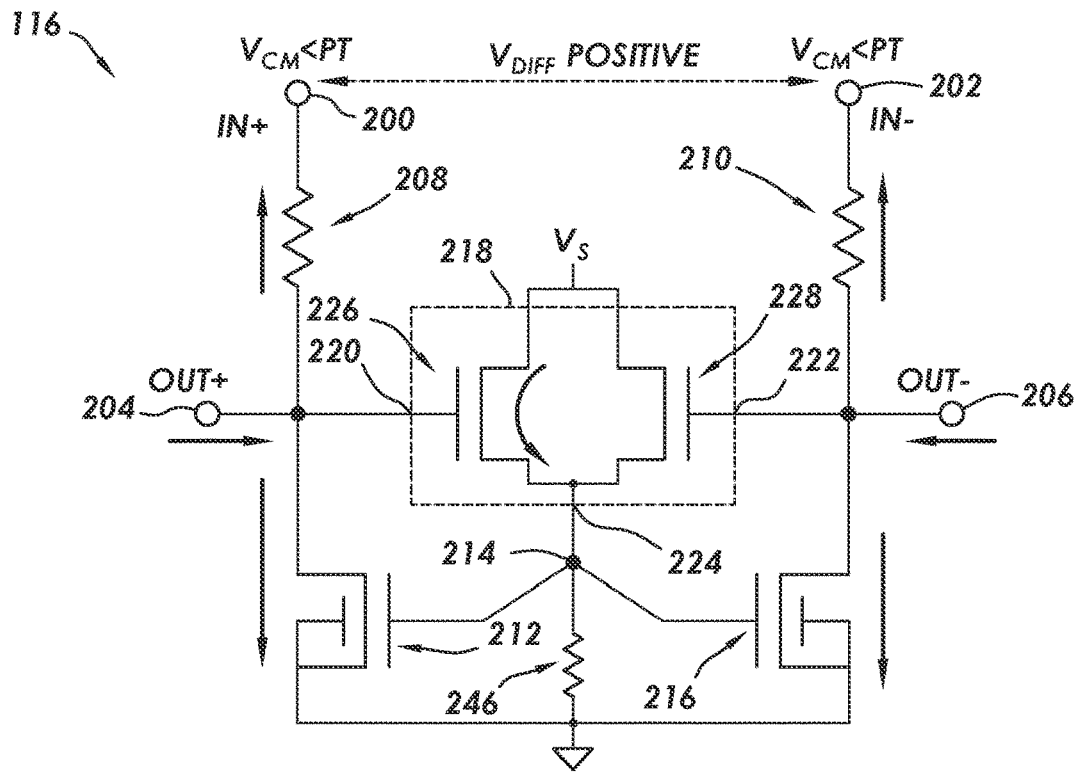
FIG. 9 shows a circuit diagram of a differential-signal receiver, annotated to show a negative common-mode voltage and a positive differential signal, in accordance with at least some embodiments.

FIG. 9 shows a circuit diagram of a differential-signal receiver, annotated to show a common-mode voltage below the predetermined threshold and a positive differential signal. In particular, FIG. 9 shows the differential-signal receiver 116 in the shorthand notation. In the example state the differential signal applied across the IN+ terminal 200 and the IN− terminal 202 is positive (indicated as "$V_{DIFF}$ POSITIVE" in the figure). The IN+ terminal 200 again has a common-mode voltage less than the predetermined threshold (indicated as "$V_{CM} < PT$" in the figure), and the IN− terminal 202 has a common-mode less than the predetermined threshold (also indicated as "$V_{CM} < PT$" in the figure). The common-mode voltage being less than the predetermined threshold covers both the situation in which the common-mode voltage is positive and below the predetermined threshold, and the case in which the common-mode voltage is negative, as only the magnitudes of the bias currents provided the bias circuit 230 change as between those two states.

Because the common-mode voltage in this example is below the predetermined threshold, the bias circuit 230 (not specifically shown, FIG. 2) drives a bias current to the OUT+ node 204 as shown, and similarly drives a bias current to the OUT− node 206 as shown. Because of the bias current flow into the OUT+ node 204 together with the positive differential signal, a voltage at the OUT+ node 204 creates a current flow through the FET 226 as shown. In this case, however, because the differential signal is positive and the IN+ terminal 200 has a higher voltage than the IN− terminal 202, the current in resistors 208 and 210 are about the same or identical, and the gate of the FET 228 has a lower voltage relative to the source, and thus the FET 228 is non-conductive (or less conductive).

At least some of the bias current provided to the OUT+ node 204 flows through FET 212, and any of the bias current that does not flow through the FET 212 flows from the OUT+ node 204 through the resistor 208 to the IN+ terminal 200, as shown. Thus, the OUT+ node 204 is clamped (e.g., at two gate-to-source voltages). Likewise, at least some of the bias current provided to the OUT− node 206 flows through FET 216, and any of the bias current that does not flow through the FET 216 flows from the OUT− node 206 through the resistor 210 to the IN− terminal 202, as shown. However, because the currents in FETs 212 and 216 are the same or about the same, the currents in resistors 208 and 210 are also the same or about the same. Thus, in the example situation the OUT+ node 204 is clamped (e.g., at the two gate-to-source voltages), and the voltage at the OUT− node 206 will be lower by the magnitude of the instantaneous differential voltage. Stated otherwise, the resistor 208 and 210 bias current is responsible for the common mode shift from IN to OUT, and excess current is conducted to the ground by the FETS 212 and 216.

Figure 10:
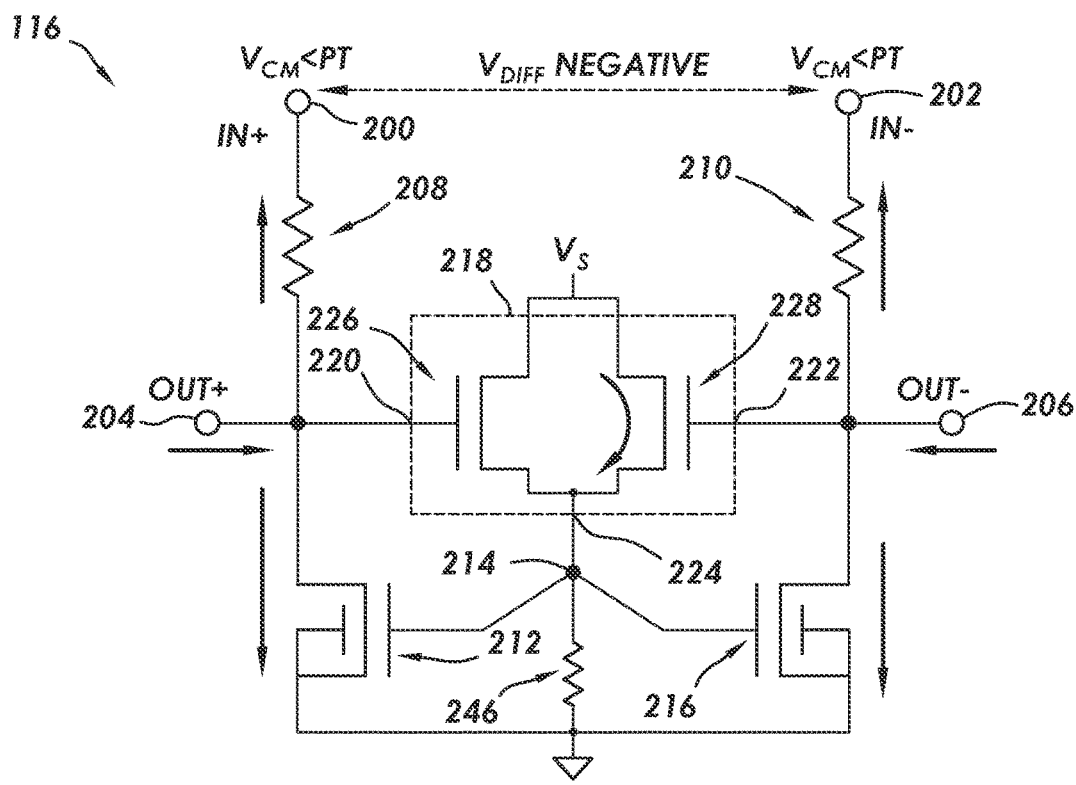
FIG. 10 shows a circuit diagram of a differential-signal receiver, annotated to show a negative common-mode voltage and a negative differential signal, in accordance with at least some embodiments.

FIG. 10 shows a circuit diagram of a differential-signal receiver, annotated to show a negative common-mode voltage and a negative differential signal, in accordance with at least some embodiments. In particular, FIG. 10 shows the differential-signal receiver 116 in the shorthand notation. In the example state the differential signal applied across the IN+ terminal 200 and the IN− terminal 202 is negative (indicated as "$V_{DIFF}$ NEGATIVE" in the figure). The IN+ terminal 200 again has a common-mode voltage less than the predetermined threshold (indicated as "$V_{CM}<PT$" in the figure), and the IN− terminal 202 again has a common-mode lower than the predetermined threshold (also indicated as "$V_{CM}<PT$" in the figure). The common-mode voltage being less than the predetermined threshold covers both the situation in which the common-mode voltage is positive and below the predetermined threshold, and the case in which the common-mode voltage is negative, as the only the magnitudes of the bias currents provided by the bias circuit 230 change as between those two states.

Because the common-mode voltage in this example is below the predetermined threshold, the bias circuit 230 (not specifically shown, FIG. 2) drives a bias current to the OUT+ node 204 as shown, and similarly drives a bias current to the OUT− node 206 as shown. Because of the bias current into the OUT− node 204 together with the negative differential signal, a voltage at the OUT− node 204 creates a current flow through the FET 228 as shown. In this case, however, because the differential signal is negative and the IN− terminal 202 has a higher voltage than the IN+ terminal 200, the gate of the FET 226 has a lower voltage relative to the source, and thus the FET 226 is non-conductive (or less conductive).

At least some of the bias current provided to the OUT− node 206 flows through FET 216, and any bias current that does not flow through the FET 216 flows from the OUT− node 206 through the resistor 210 to the IN− terminal 202, as shown. Thus, the OUT− node 206 is clamped (e.g., at two gate-to-source voltages). Likewise, at least some of the bias current provided to the OUT+ node 204 flows through FET 212, and any bias current that does not flow through the FET 212 flows from the OUT+ node 204 through the resistor 208 to the IN+ terminal 200, as shown. However, because the voltage at the IN+ terminal 200 is lower than the voltage at the IN− terminal 202 as caused by the negative differential signal, and given the same bias current, bias current flows through resistor 208 and 210, the voltage of the OUT+ node will be lower than the voltage of the OUT− node. Thus, in the example situation the OUT− node 206 is clamped (e.g., at the two gate-to-source voltages), and the voltage at the OUT+ node 204 will be lower by the magnitude of the instantaneous differential voltage.

The specification to this point describes example cases in which the bias circuit 230 provides the bias currents only when the common-mode voltage is below the predetermined threshold. However, the common-mode voltage may swing quickly in certain situations, and in order to the receiver 116 to react quickly to the common-mode voltage swings, in yet still further cases the bias circuit 230 may provide bias currents at all times. For example, when the common-mode voltage is above the predetermined threshold, the bias circuit 230 may drive the FETS 238 and 242 to provide respective constant bias current, and then the bias circuit 230 may ramp the bias currents as the common-mode voltage falls below the predetermined threshold. In other cases, the bias circuit 230 may provide bias currents at all times, with the magnitude of the bias currents inversely proportional to the common-mode voltage. Further still, the bias circuit 230 may be designed and constructed such that respective bias currents are provided independent of the magnitude of the common-mode voltage. That is, the bias circuit 230 may be designed and constructed to provide constant bias current.

Figure 11:
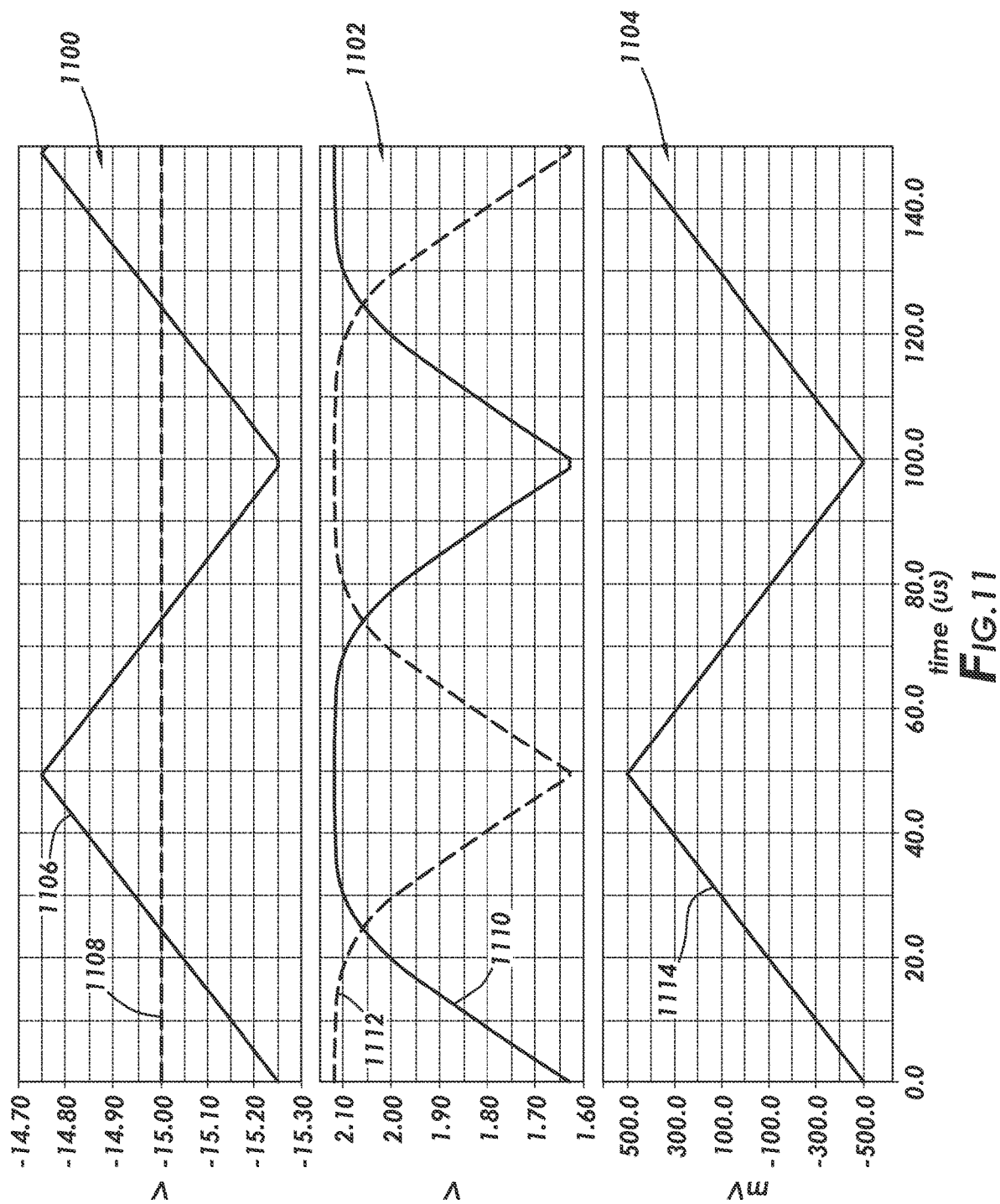
FIG. 11 shows a several plots as a function of time during operation of the example differential-signal receiver, in accordance with at least some embodiments.

FIG. 11 shows a several plots as a function of time during operation of the example differential-signal receiver 116. In particular, the upper plot 1100 shows voltage as a function of time applied across the IN+ terminal 200 and the IN− terminal 202. Plot 1102 shows both the voltage as a function of time at the OUT+ node 204 and separately shows the voltage as a function of time at the OUT− node 206. Plot 1104 shows the differential voltage as a function of time, the differential voltage taken across the OUT+ node 204 and the OUT− node 206.

Referring initially to the plot 1100. The plot 1100 shows an example voltage as a function of time applied across the IN+ terminal 200 and the IN− terminal 202. In the example situation of the plot 1100, the differential signal 1106 is shown "riding" a negative common-mode voltage of about −15V. That is to say, the differential voltage together with the common-mode voltage causes the voltage taken across the IN+ terminal 200 and the IN− terminal 202 to rise and fall about the example common-mode voltage of −15V, shown by dashed line 1108.

Plot 1102 shows a voltage as a function of time on the OUT+ node 204 relative to reference voltage (e.g., ground, common) of the differential-signal receiver 116, the voltage hereafter OUT+ Voltage 1110. Plot 1102 also shows a voltage as a function of time on the OUT− node 206 relative to the reference voltage, the voltage hereafter OUT− Voltage 1112. As the differential signal 1106 rises, the OUT+ Voltage 1110 rises but then is clamped at about 2.1 V in the example. As the differential signal 1106 rises, the OUT− Voltage 1112 falls with a slope inversely proportional to the slope of the rising differential signal 1106, reaching a negative inflection point at the point in time at which the differential signal 1106 reaches its positive inflection point.

Oppositely, as the differential signal 1106 falls, the OUT− Voltage 1112 rises but then is clamped at about 2.1V in the example. As the differential signal 1106 falls, the OUT+ Voltage 1110 falls with a slope proportional to the slope of the falling differential signal 1106, reaching a negative inflection point at the point in time at which the differential signal 1106 reaches its negative inflection point. Plot 1104 shows an output voltage 1114 of the differential-signal receiver 116 taken across the OUT+ node 204 and the OUT− node 206. The output voltage 1114 accurately reflects the differential signal in spite of the negative common-mode voltage. Attributable to the common gate voltage of FETs 212 and 216, the current in the FETS is about equal and the differential signal at IN+ terminal 200 and IN− terminal 202 is available across the OUT+ node 204 and OUT− node 206 with little or no attenuation.

Figure 12:
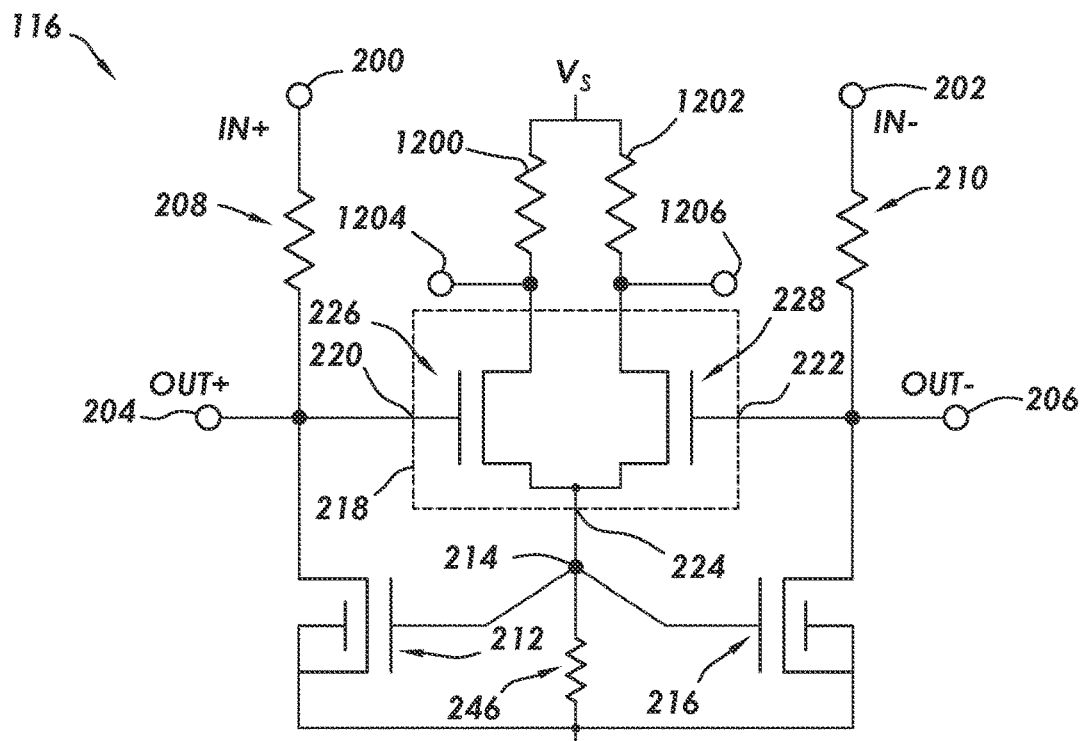
FIG. 12 shows a differential-signal receiver in accordance with at least some embodiments.

FIG. 12 shows another example differential-signal receiver 116. The example differential-signal receiver 116 of FIG. 12 further comprises a resistor 1200 coupled between the source voltage $V_S$ and the drain the FET 226, and a resistor 1202 coupled between the source voltage $V_S$ and the drain the FET 228. In some cases the resistance of the resistor 1200 is the same as the resistance of the resistor 1202, within manufacturing tolerances. The example currents through the FETs 226 and 228 of the selector circuit 218, as discussed in detail above, produce voltages at an alternative OUT+ node 1204 and an alternative OUT− node 1206. The differential-signal receiver 116 otherwise operate the same as previously described, but the differential signal may be detected or extracted across the alternative OUT+ node 1204 and an alternative OUT− node 1206 rather than the OUT+ node 204 and an alternative OUT− node 206.

Figure 13:
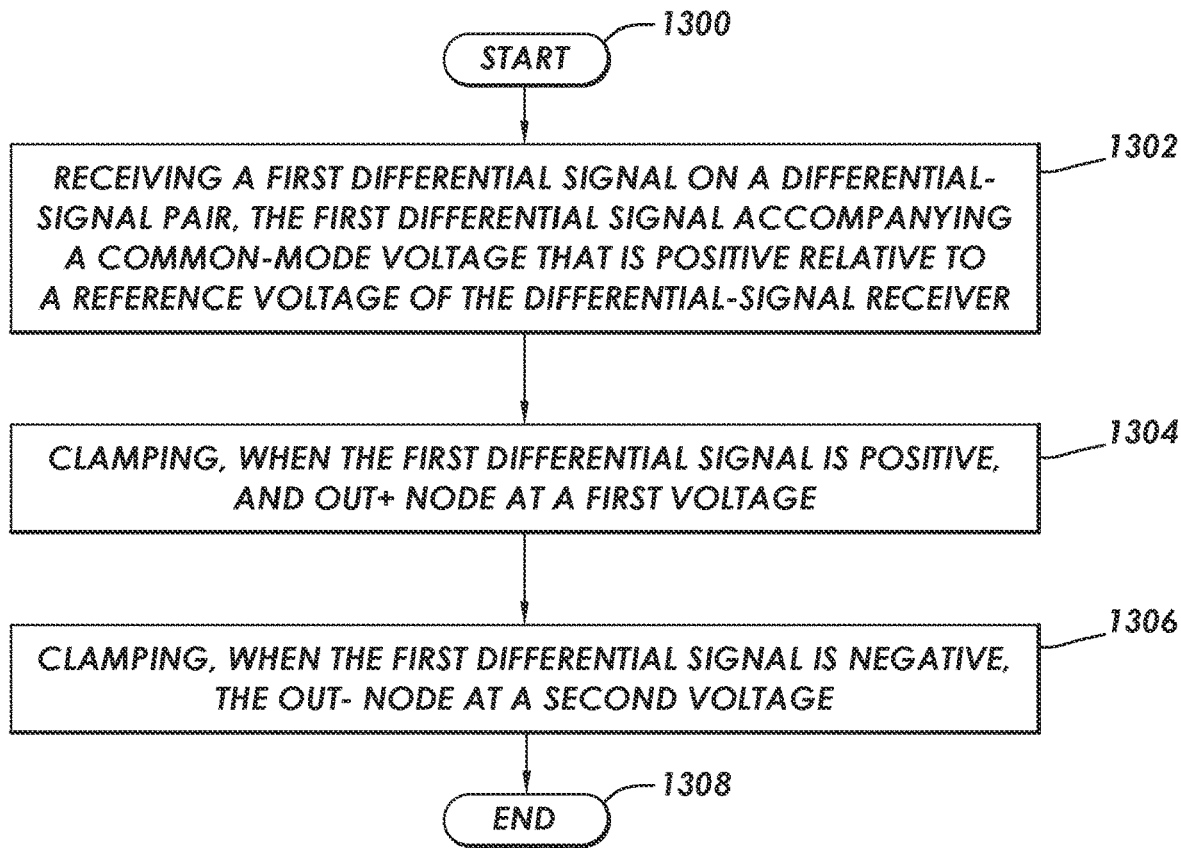
FIG. 13 shows a method in accordance with at least some embodiments.

FIG. 13 shows a method in accordance with at least some embodiments. In particular, the method starts (block 1300) and comprises: receiving a first differential signal on a differential-signal pair, the first differential signal accompanying a common-mode voltage that is positive relative to a reference voltage of the differential-signal receiver (block 1302); clamping, when the first differential signal is positive, an OUT+ node at a first voltage (block 1304); and clamping, when the first differential signal is negative, the OUT− node at a second voltage (block 1306). Thereafter, the example method ends (block 1308).

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various embodiments of the present invention. Numerous variations and modifications will become apparent to those skilled in the art once the above disclosure is fully appreciated. For example, driver modules may be daisy-chained with other driver modules, and thus a drive module (e.g., driver module 104) may be considered a light controller (such as light controller 102). Stated otherwise, the driver module 104 may be acting as a light controller for downstream driver modules in a daisy-chained arrangement. Further still, the resistor 246 could be replaced with a DC current source to bias the FETs 226 and 228. It is intended that the following claims be interpreted to embrace all such variations and modifications.

What is claimed is:

1. A method of operating a differential-signal receiver, the method comprising:
   receiving a first differential signal on a differential-signal pair, the first differential signal accompanying a common-mode voltage that is positive relative to a reference voltage of the differential-signal receiver;
   clamping, when the first differential signal is positive, an OUT+ node at a first voltage; and
   clamping, when the first differential signal is negative, an OUT− node at a second voltage.

2. The method of claim 1 wherein clamping the OUT+ node at the first voltage further comprises:
   flowing a first current through a first transistor of a selector circuit and creating a first mirror current flowing away from the OUT+ node to clamp the OUT+ node at the first voltage, the first mirror current based on to the first current; and
   refraining from flowing current through a second transistor of the selector circuit, and creating a second mirror current away from the OUT− node, the second mirror current based on the first current.

3. The method of claim 2 wherein clamping the OUT− node at the second voltage further comprises:
   flowing a second current through the second transistor of the selector circuit and creating a third mirror current flowing away from the OUT− node to clamp the OUT− node at the second voltage, the third mirror current based on the second current; and
   refraining from flowing current through the first transistor of the selector circuit, and creating a fourth mirror current away from the OUT+ node, the fourth mirror current based on the second current.

4. The method of claim 1 further comprising:
   receiving a second differential signal on the differential-signal pair, the second differential signal accompanying a common-mode voltage that is negative relative to the reference voltage of the differential-signal receiver;
   supplying, by the differential-signal receiver, a bias current to the OUT+ node and supplying a bias current to the OUT− node;
   clamping, when the second differential signal is positive, the OUT+ node at a third voltage; and
   clamping, when the second differential signal is negative, the OUT− node at a fourth voltage.

5. The method of claim 4 wherein clamping the OUT+ node at the third voltage further comprises:
   flowing a first current through a first transistor of a selector circuit and creating a first mirror current flowing away from the OUT+ node to clamp the OUT+ node at the third voltage, the first mirror current based on the first current; and
   refraining from flowing current through a second transistor of the selector circuit, and creating a second mirror current away from the OUT− node, the second mirror current based on the first current.

6. The method of claim 5 wherein clamping the OUT− node at the fourth voltage further comprises:
   flowing a second current through the second transistor of the selector circuit and creating a third mirror current flowing away from the OUT− node to clamp the OUT− node at the fourth voltage, the second mirror current based on the second current; and refraining from flowing current through the first transistor of the selector circuit, and creating a fourth mirror current away from the OUT+ node, the fourth mirror current based on the second current.

7. The method of claim 1 further comprising, when the first differential signal across the differential-signal pair is zero and the common-mode voltage is below a first predetermined threshold that is non-zero and positive, clamping the OUT+ node and the OUT− node at a third clamp voltage.

8. The method of claim 7 wherein clamping at the third clamp voltage further comprises:
   driving a first bias current having a magnitude to the OUT+ node; and
   driving a second bias current having the magnitude to the OUT− node.

9. A differential-signal receiver comprising:
   an IN+ terminal, an IN− terminal, an OUT+ node, and an OUT− node;
   a first resistor having a first resistance, the first resistor coupled between the IN+ terminal and the OUT+ node;
   a second resistor having a second resistance, the second resistor coupled between the IN− terminal and the OUT− node;
   a first transistor having a first connection coupled to the OUT+ node, a second connection coupled to a reference voltage, and a control input;
   a second transistor having a first connection coupled to the OUT− node, a second connection coupled to the reference voltage, and a control input coupled to the control input of the first transistor; and
   a selector circuit defining a plus port coupled to the OUT+ node, a minus port coupled to the OUT− node, and a mirror output coupled to the control input of the first transistor and the control input of the second transistor, wherein the selector circuit is configured to, when a common-mode voltage on the IN+ and the IN− terminal is positive, drive the mirror output proportional to a magnitude of the common-mode voltage.

10. The differential-signal receiver of claim 9 wherein the selector circuit further comprises:
    a third transistor having a first connection coupled to a voltage source, a second connection coupled to the mirror output, and a control input coupled to the OUT+ node; and
    a fourth transistor having a first connection coupled to the voltage source, a second connection coupled to the mirror output, and a control input coupled to the OUT− node.

11. The differential-signal receiver of claim 10 wherein the third transistor is an N-channel field effect transistor (FET), and the fourth transistor is an N-channel FET.

12. The differential-signal receiver of claim 10 further comprising:
    a third resistor coupled between the voltage source and the first connection of the third transistor, the third resistor having a third resistance;
    a fourth resistor coupled between the voltage source and the first connection of the fourth transistor, the fourth resistor having a fourth resistance; and
    the differential-signal receiver configured to reproduce a differential-signal received on the IN+ terminal and the IN− terminal across the first connection of the third transistor and the first connection of the fourth transistor.

13. The differential-signal receiver of claim 9 further comprising a bias circuit, the bias circuit comprising:
    a positive-drive output coupled to the OUT+ node;
    a negative-drive output coupled to the OUT− node;
    a sense input coupled to the mirror output; and
    wherein the bias circuit is configured to, when the common-mode voltage is below a predetermined threshold, drive a bias current to the OUT+ node and drive a bias current to the OUT− node, the bias currents proportional to an amount the magnitude of the common-mode voltage is below the predetermined threshold.

14. The differential-signal receiver of claim 9 where first resistance is equal to the second resistance.

15. A light control system comprising:
    a light controller defining a differential-signal pair comprising a first conductor and a second conductor;
    a driver module coupled to the light controller by way of the differential-signal pair, the driver module including a differential-signal receiver comprising:
       an IN+ terminal coupled to the first conductor, an IN− terminal coupled to the second conductor, an OUT+ node, and an OUT− node;
       a first resistor having a first resistance, the first resistor coupled between the IN+ terminal and the OUT+ node;
       a second resistor having a second resistance, the second resistor coupled between the IN− terminal and the OUT− node;
       a first transistor having a first connection coupled to the OUT+ node, a second connection coupled to a reference voltage, and a control input;
       a second transistor having a first connection coupled to the OUT− node, a second connection coupled to the reference voltage, and a control input coupled to the control input of the first transistor; and
       a selector circuit defining a plus port coupled to the OUT+ node, a minus port coupled to the OUT− node, and a mirror output coupled to the control input of the first transistor, wherein the selector circuit is configured to, when a common-mode voltage on the IN+ and the IN− terminal is positive, drive the mirror output proportional to a magnitude of the common-mode voltage.

16. The light control system of claim 15 wherein the selector circuit further comprises:
    a third transistor having a first connection coupled to a voltage source, a second connection coupled to the mirror output, and a control input coupled to the OUT+ node; and
    a fourth transistor having a first connection coupled to the voltage source, a second connection coupled to the mirror output, and a control input coupled to the OUT− node.

17. The light control system of claim 16 wherein the third transistor is an N-channel field effect transistor (FET), and the fourth transistor is an N-channel FET.

18. The light control system of claim 16 wherein the differential-signal receiver further comprises:
    a third resistor coupled between the voltage source and the first connection of the third transistor, the third resistor having a first matching resistance;
    a fourth resistor coupled between the voltage source and the first connection of the fourth transistor, the fourth resistor having a second matching resistance; and
    the differential-signal receiver configured to reproduce a differential signal received on the IN+ terminal and the IN− terminal across the first connection of the third transistor and the first connection of the fourth transistor.

19. The light control system of claim 15 wherein the differential-signal receiver further comprises a bias circuit, the bias circuit comprising:
   a positive-drive output coupled to the OUT+ node;
   a negative-drive output coupled to the OUT− node;
   a sense input coupled to the mirror output; and
   wherein the bias circuit is configured to, when the common-mode voltage is below a predetermined threshold, drive a bias current to the OUT+ node and drive a bias current to the OUT− node, the bias currents proportional to an amount the magnitude of the common-mode voltage is below the predetermined threshold.

20. The light control system of claim 15 where first resistance is equal to the second resistance.

* * * * *